United States Patent
Fellows et al.

(10) Patent No.: US 9,729,610 B2
(45) Date of Patent: Aug. 8, 2017

(54) METHOD FOR INTERCEPTING AN INSTRUCTION PRODUCED BY AN APPLICATION ON A COMPUTER

(71) Applicant: Greenbutton Limited, Te Aro, Wellington (NZ)

(72) Inventors: David Emerson Fellows, Wellington (NZ); George Edward Pollard, Auckland (NZ)

(73) Assignee: Greenbutton Limited (NZ)

(*) Notice: Subject to any disclaimer, the term of this patent is extended or adjusted under 35 U.S.C. 154(b) by 506 days.

(21) Appl. No.: 14/192,470

(22) Filed: Feb. 27, 2014

(65) Prior Publication Data

US 2014/0244791 A1    Aug. 28, 2014

Related U.S. Application Data

(60) Provisional application No. 61/770,290, filed on Feb. 27, 2013.

(51) Int. Cl.
*H04L 29/08* (2006.01)
*H04L 12/58* (2006.01)
*G06F 15/16* (2006.01)
*G06F 9/50* (2006.01)

(52) U.S. Cl.
CPC ........... *H04L 67/06* (2013.01); *H04L 51/22* (2013.01); *H04L 67/1097* (2013.01); *G06F 9/5083* (2013.01)

(58) Field of Classification Search
CPC ..... H04L 67/06; H04L 51/22; H04L 67/1097; G06F 3/0607; G06F 9/5083

USPC ................ 709/217, 229, 201, 219
See application file for complete search history.

(56) References Cited

U.S. PATENT DOCUMENTS

| | | | |
|---|---|---|---|
| 6,804,718 B1 | 10/2004 | Pang | |
| 7,266,555 B1 * | 9/2007 | Coates | G06F 17/30132 707/827 |
| 8,103,656 B2 | 1/2012 | Krishnamoorthy | |
| 8,214,843 B2 | 7/2012 | Boss | |
| 8,700,804 B1 * | 4/2014 | Meyers | H04L 67/1095 709/217 |
| 8,706,800 B1 * | 4/2014 | Ahmed | G06F 9/468 709/201 |
| 2002/0062334 A1 | 5/2002 | Chen | |
| 2002/0099789 A1 | 7/2002 | Rudolph | |
| 2006/0070078 A1 | 3/2006 | Dweck | |
| 2006/0265445 A1 | 11/2006 | Gustavson | |

(Continued)

FOREIGN PATENT DOCUMENTS

| | | |
|---|---|---|
| EP | 2 439 687 | 4/2012 |
| WO | WO 01/35629 | 5/2001 |

(Continued)

*Primary Examiner* — David Lazaro
*Assistant Examiner* — Zi Ye
(74) *Attorney, Agent, or Firm* — Workman Nydegger

(57) ABSTRACT

A method for executing an application on a processor, wherein executing the application includes accessing a data file on a local storage. The method includes the steps of: producing an instruction to use a data file on a local storage; sending a request to retrieve the data file; intercepting the request and temporarily suspending it; downloading the data file from a remote storage to the local storage; allowing the request to retrieve the data file to complete; and using the data file.

26 Claims, 5 Drawing Sheets

(56) References Cited

U.S. PATENT DOCUMENTS

| | | | |
|---|---|---|---|
| 2007/0130075 A1* | 6/2007 | Song | G06F 8/60 705/51 |
| 2007/0271547 A1* | 11/2007 | Gulko | G06F 8/451 717/106 |
| 2009/0299920 A1 | 12/2009 | Ferris | |
| 2010/0115521 A1 | 5/2010 | Morisada | |
| 2010/0228861 A1 | 9/2010 | Arsovski | |
| 2010/0262977 A1 | 10/2010 | Havemose | |
| 2011/0041136 A1 | 2/2011 | Messier | |
| 2011/0138050 A1 | 6/2011 | Dawson | |
| 2011/0153824 A1 | 6/2011 | Chikando | |
| 2011/0231899 A1 | 9/2011 | Pulier | |
| 2011/0238458 A1 | 9/2011 | Purcell | |
| 2012/0005359 A1 | 1/2012 | Seago | |
| 2012/0095908 A1 | 4/2012 | Barrie | |
| 2012/0110570 A1 | 5/2012 | Jacobson | |
| 2012/0131591 A1 | 5/2012 | Moorthi | |
| 2012/0166514 A1* | 6/2012 | Mathew | G06F 9/5083 709/201 |
| 2012/0173708 A1 | 7/2012 | Bartfai | |
| 2012/0185868 A1 | 7/2012 | Bartfai | |

FOREIGN PATENT DOCUMENTS

| | | |
|---|---|---|
| WO | WO 01/67379 | 9/2001 |
| WO | WO 2010/058989 | 5/2010 |
| WO | WO 2011/143568 | 11/2011 |
| WO | WO 2011/144029 | 11/2011 |
| WO | WO 2012/024955 | 3/2012 |

\* cited by examiner

METHOD FOR INTERCEPTING AN INSTRUCTION PRODUCED BY AN APPLICATION ON A COMPUTER

This application is claims benefit of U.S. Provisional Ser. No. 61/770,290, filed 27 Feb. 2013 and which application is incorporated herein by reference. To the extent appropriate, a claim of priority is made to each of the above disclosed applications.

FIELD OF THE INVENTION

The present invention relates to a method for executing an application on a processor. In particular, it relates to a method for intercepting an instruction produced by the application to access local data files.

BACKGROUND TO THE INVENTION

Cloud computing systems have become an increasingly common aspect of computing technology. Cloud computing systems rely on networked computing resources to give a user a particular level of service. Generally, this service may be categorised as one of three types:

Infrastructure as a service (IaaS)—provides the use of the hardware within the cloud computing system for a user—for example, job processing, virtual machines or storage.

Platform as a service (PaaS)—provides the use of a computing platform on a cloud computing service for a user—for example, job processing or software development.

Software as a service (SaaS)—provides software that is hosted on a cloud computing service to a user—for example, email or business applications.

Such cloud computing systems may be private or public or a hybrid of both.

One particular advantage of cloud computing systems is that due to the number of central processing units/compute nodes networked together in the system, complex and time consuming computations can be carried out quickly. In this way large jobs may be computed while saving the user time and money. For users who cannot afford to maintain a cloud computing system for their private use, there is the alternative option of using a public cloud computing system as and when the need arises. Typically, this may be provided by a cloud computing service provider to the user at either an IaaS or PaaS level. In this situation, the cloud computing service provider may give the user access to the resources on the cloud computing system.

One problem with this solution is that the user needs to enable the application so that it can run on the cloud computing system in order to compute the particular jobs that the user needs the cloud computing system to compute. This can require adapting the computer application (with which the job is associated) so that it can be executed on the particular cloud computing system. The user will also need to manage the running of the application on the cloud computing system. This can be costly and time-consuming, especially for developers of applications not familiar with the framework of the cloud computing system. It may also limit the options for the cloud computing system available to a user to compute their jobs (for example, the adapted application may be limited to a specific platform). Alternatively, the job may need to be adapted to suit the systems/applications already provided by the cloud computing service providers. Again, this can be costly, time-consuming and limited to specific types of cloud computing systems. The other challenge relates to scaling out many compute nodes to work jointly on a particular job. This requires significant development effort to provision and manage the compute resources in a cloud computing system.

Another problem with such systems is that jobs submitted to a cloud computing system for computing may be dependent on complex and/or bulky data files. For example, a rendering job may be reliant on a large library of texture files or similar. So that a job computes correctly, these file dependencies need to be readily available to the compute node that is computing the job. This may require programmatically ascertaining which data files a job may need in advance of the job being computed, and loading only those that are needed onto the compute node. This can be difficult and time-consuming. Alternatively, all of the data files may be loaded on the compute node, but where the set of all user data files are large this can take up a significant amount of time, which is also costly and time-consuming. In many cases, the entire set of user data files may not fit on an individual compute node's local storage.

It is an object of the present invention to provide a method for enabling an application to run on a cloud computing system and for deploying the application to the cloud computing system, which alleviates some of the problems described above. That is to say, a method that is less complex and is portable to multiple cloud computing systems. It is also object to provide a method of computing a job on a cloud computing system that is less complex and portable.

It is a further object of the present invention to provide a method for computing a job on a cloud computing system that is not burdened by having to download complex and/or bulky data files.

Each object is to be read disjunctively with the object of at least providing the public with a useful choice.

SUMMARY OF THE INVENTION

According to one embodiment, there is provided a computer implemented method for executing an application on a processor, wherein executing the application includes at least one task that requires accessing a data file on a local storage, comprising the steps of: producing an instruction in the processor as part of a task to use a required data file at a specified path on a local storage; sending a request from the processor to retrieve the required data file from the specified path on the local storage; intercepting the request once it has been sent and temporarily suspending the request to retrieve the required data file; downloading the required data file from a remote storage to the specified path on the local storage; allowing the request to retrieve the required data file to complete; and using the required data file by the processor as required by the task According to another embodiment, there is provided a file interception device associated with a compute node having a processor, wherein upon executing an application on the compute node, the application having a task that requires accessing a data file on a local storage: the processor produces an instruction as part of the task to use a required data file at a specified path on the local storage; the processor sends a request to retrieve the required data file from the specified path on the local storage; the file interception device intercepts the request once it has been sent and temporarily suspends the request to retrieve the required data file; the file interception device downloads the required data file from a remote storage to the specified path on the local storage; the file interception device allows the request to retrieve the required data file to complete; and the processor uses the required data file as required by the task.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

Reference to any prior art in this specification does not constitute an admission that such prior art forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention.

DETAILED DESCRIPTION

Though this specification will refer to a 'cloud computing system', there are many other terms that may be used interchangeably in the art, such as 'distributed computing systems', 'networked computing systems', 'grid computing systems', 'parallel computing systems' or simply the 'cloud'. Further, it may be possible that one particular cloud computing system may reside in a broader cloud computing system. As an inherently nebulous term, the bounds of any particular cloud computing system may not easily be defined. For the purposes of this specification, cloud computing systems may be considered to be computing systems that are accessed over a wide area network, as opposed to computing systems that are restricted to access from within the same local network.

Figure 1:
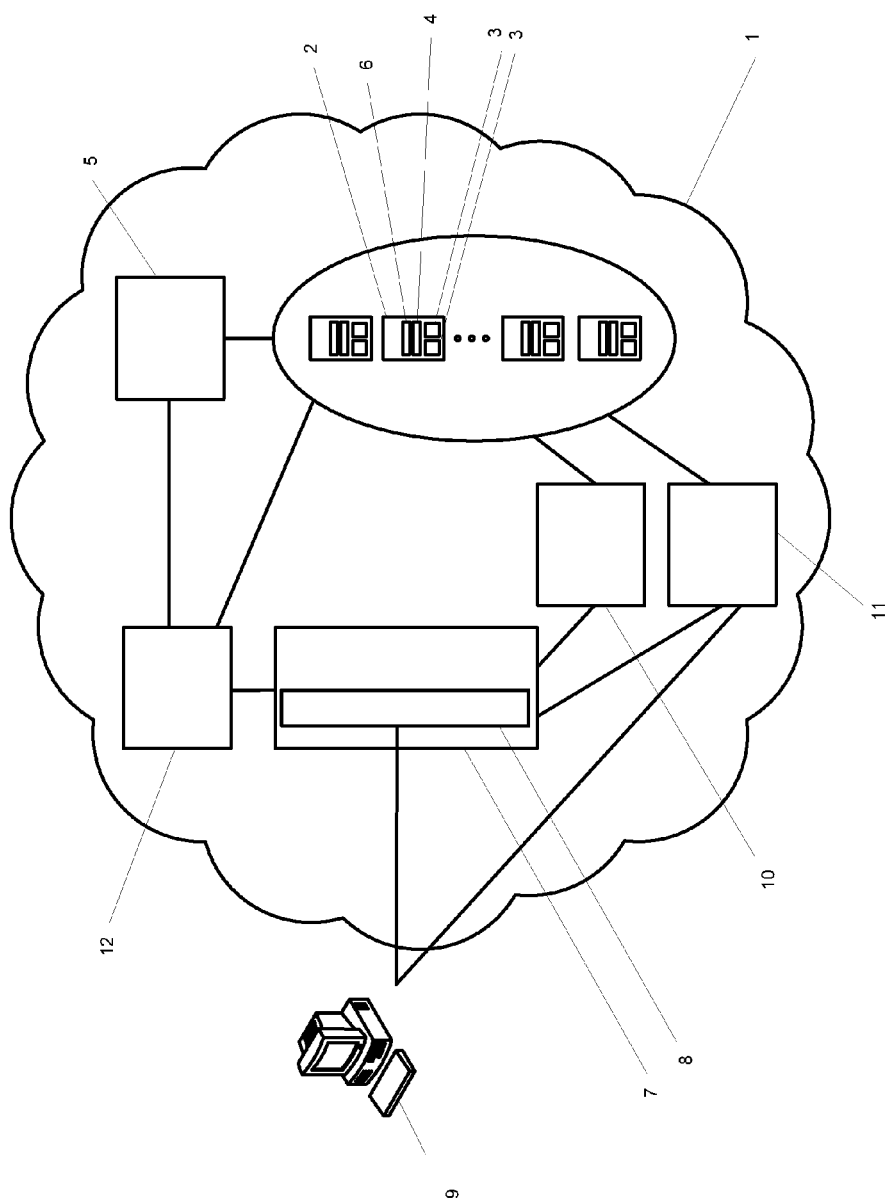
FIG. 1 shows a general representation of a cloud computing system.

Referring to FIG. 1, there is shown a general representation of a cloud computing system 1 that has been adapted to work with the method described in more detail below. The cloud computing system includes a plurality of compute nodes 2 (only one of which has been indicated) that are networked together. Each compute node may include a plurality of central processing units 3 (also known as 'processing cores' or simply 'processors'). Each compute node 2 may also include a suitable platform layer (for example, Windows Azure) 4. The operation of the compute nodes may be managed using a suitable cloud management API 5. This cloud management API allows control of the general aspects of the running of the compute nodes, such as the allocation of resources, backing up, communications, network management, services and power supply. In some embodiments, the compute nodes may be adapted to control some of these aspects independently. Each compute node may be adapted to include a middleware layer 6. As will be expanded upon later, the middleware layer is an abstraction layer set up on each compute node. It is this middleware layer which provides a consistent interface between task processors, the underlying platform and the compute nodes.

Those skilled in the art will appreciate that there are any number of possible configurations of compute nodes 2 that may be used in a cloud computing system 1. This can include, but is not limited to, compute nodes housed within a specialised data center. The compute nodes may all be located at one place (for example, a specific data center) or they may be located across multiple places (for example, multiple data centers). Indeed, in one extreme, cloud computing systems that rely on crowd-sourced processing may have compute nodes located in personal computers all over the globe (networked together over the internet). The compute nodes may be networked by any suitable means. This can include, for example, local area networking or wide area networking (such as the internet). The compute nodes may all be adapted to run the same platform 4 (for example, Microsoft Windows Azure or Amazon Web Services) or they may run one of a plurality of platforms. Regardless, the compute nodes are adapted so that the middleware layer 6 ensures a consistent interface whatever the platform or underlying structure of the compute node. The plurality of compute nodes may be provided by a cloud computing service provider at an infrastructure as a service level.

The cloud computing system 1 may be adapted to include an external API host 7. As will be discussed in more detail below, this external API host manages the deployment of applications to the cloud computing system and the processing of jobs on the cloud computing system. The external API host includes an external API 8, which is adapted to interface with User local computer(s) 9 over the internet. The external API host may be hosted on web servers in the cloud computing system. In the cloud computing system shown in FIG. 1, the external API host is shown wholly within the cloud computing system, however it may also be possible for the external API host to be considered as wholly or partly separate from the cloud computing system. To manage the deployment of applications to the cloud computing system, the external API host is adapted suitably to store data in a temporary storage 10 or a cloud storage facility 11 which can be accessed by the compute nodes 2 within the cloud computing system. As will be discussed in more detail below, the temporary storage may be used to store tasks before they are accessed by compute nodes. This may be through the use of message queues or any other suitable means. Other data required for computing a job can be stored in a longer-term cloud storage facility.

The external API host 7 is also connected to a cloud resource controller 12, which in turn may be connected to the cloud management API 5. This allows, for example, the external API host to instruct the cloud resource controller to provision a required number of computer nodes 2 via the cloud management API. Information about the compute nodes, such as availability and operating characteristics, may be provided to the cloud resource controller by the cloud computing system through the cloud management API. The cloud resource controller may also control the allocation of tasks to the compute nodes. In the cloud computing system shown in FIG. 1, the cloud resource controller is shown within the cloud computing system 1, however it may also be possible for the cloud resource controller to be considered as wholly or partly separate from the cloud computing system.

FIG. 1 also shows a cloud storage facility 11. The cloud storage facility may be adapted to store data on the cloud computing system 1 using any suitable method and independently from any specific compute node 2. The cloud storage facility may be adapted to transfer data to and from any of the plurality of compute nodes, and to and from the external API host 7. In the cloud computing system shown in FIG. 1, the cloud storage facility is shown within the cloud computing system; however it may also be possible for the cloud storage facility to be considered as separate from the cloud computing system.

Finally, FIG. 1 also shows a user local computer 9 adapted to connect to the cloud computing system 1 via the external API 8. In one embodiment, the user local computer may be adapted to connect to the external API over the internet (and vice versa). Those skilled in the art will appreciate that any suitable means of communication may be used. The user local computer can include any other number of suitable systems that may be able to communicate with a cloud computing system. Those skilled in the art will appreciate that there are any number of possible systems that may fall within this category. The user local computer may be a computer of a user, a developer's terminal, a smart device, a server system or part of a server system, or a batch process running from a computing system.

As will be discussed in more detail later, the user local computer 9 may be adapted to run an application, and to submit jobs from the application to the external API 8. The user local computer may also be used to enable an application to run on the cloud computing system 1.

Figure 2:
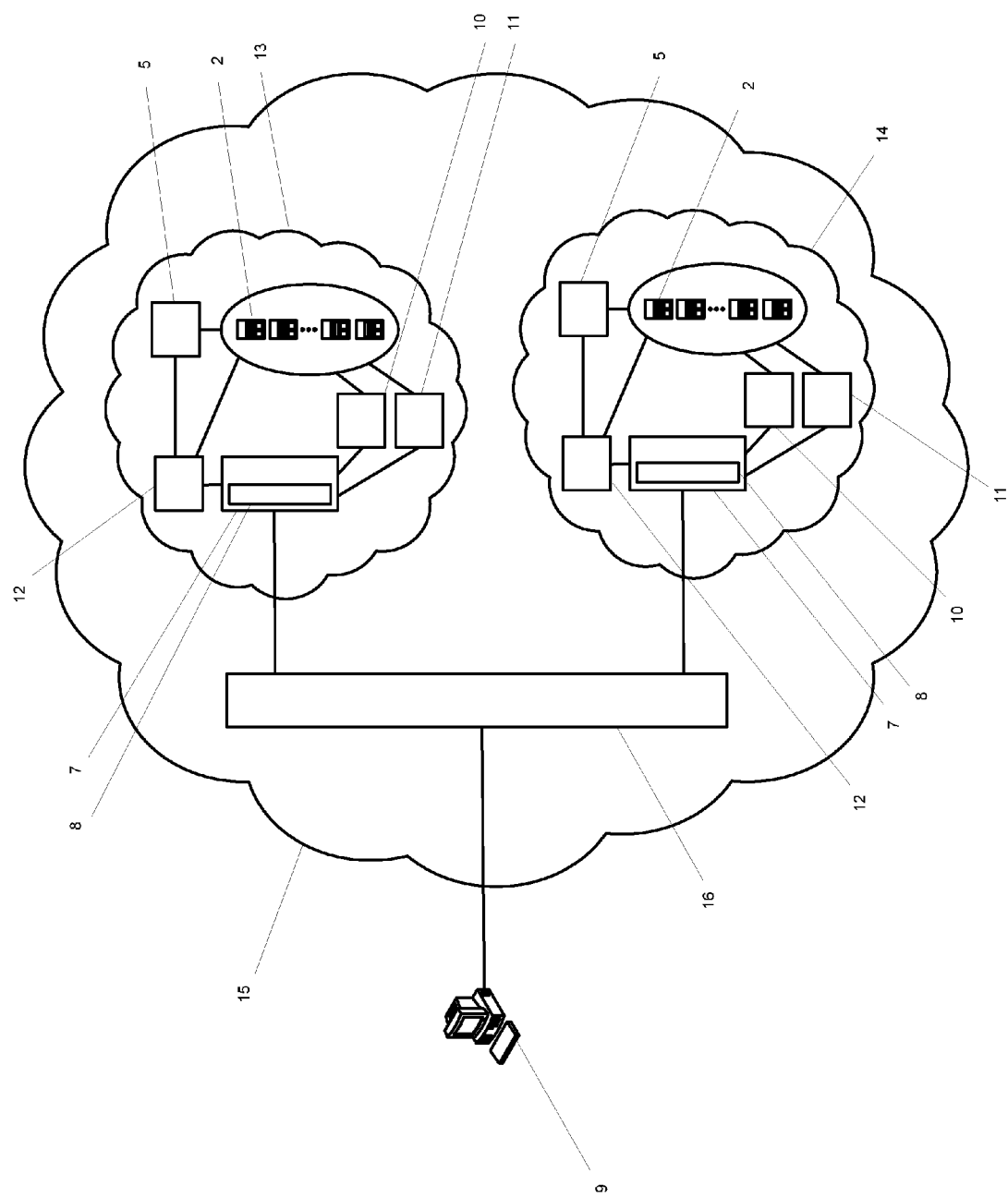
FIG. 2 shows a general representation of a plurality of cloud computing systems.

Referring to FIG. 2, there is shown another embodiment of cloud computing systems that have been adapted to work with the method described in more detail below. In this embodiment, there are two separate cloud computing systems 13 14 within a broader 'cloud' 15. Though for the sake of this description the cloud computing systems are depicted with the same representation, they may in fact be different. For example, they may be cloud computing systems provided by different cloud computing service providers; they may have different architectures; or they may run using a different platform. Also, though only two cloud computing systems are shown, it possible for there to be any number of cloud computing systems. In this embodiment, each cloud computing system includes the compute nodes 2 (only one of which per cloud computing system have been indicated), cloud management API 5, cloud resource controller 12, external API host 7, cloud storage facility 11 and temporary storage 10 that were described in relation to FIG. 1.

In this embodiment, the user local computer 9 does not necessarily communicate directly with the external API 8 of a particular cloud computing system 13 14, but may communicate via a routing mechanism 16. This is particularly the case where a job is computed on one of a plurality of cloud computing systems or where a job is computed across a plurality of cloud computing systems. The routing mechanism may be adapted to suitably direct communications between the user local computer and the external API of the appropriate cloud computing system. Though FIG. 2 shows a distinct cloud resource controller 12, external API host 7 and external API 8, cloud storage facility 11 and temporary storage 10 within each cloud computing system, it is possible that any of these may be placed (either wholly or in part) within the broader cloud 15. As an example, the external API host may be incorporated with the routing mechanism, whilst the cloud resource controller, cloud storage facility and temporary storage remain within each cloud computing system. In this way, the external API host may be able to manage the running of jobs across multiple cloud computing systems.

The foregoing description of FIGS. 1 and 2 has described the different components in general terms, however it is possible that rather than being virtualised components, they may also be synonymous with dedicated independent hardware.

Though the remainder of this description will focus on the cloud computing system of FIG. 1 (i.e. where there is just a single cloud computing system considered), those skilled in the art will appreciate how different steps may be modified for embodiments with multiple cloud computing systems.

Those skilled in the art will appreciate from the above discussion in relation to FIGS. 1 and 2 that the cloud computing system is essentially a generic cloud computing system that has been adapted to work with the method described below. In particular (and without limiting the scope of the invention), the underlying cloud computing system has been adapted so as to include the middleware layer on the compute nodes and the external API host.

By adapting the underlying cloud computing system to include the middleware layer, it becomes possible for the compute nodes to interface with the task processor (which will be described in more detail below) regardless of the underlying configuration of the compute node. Further, by adapting the underlying cloud computing system to include the external API host, it becomes possible for the cloud computing system to run the splitting algorithm (which will be described in more detail below) and to manage computing of jobs and tasks according to the method described below. It will become apparent from the following description that the middleware layer, external API host, task processor and splitting algorithm are all configured cooperatively to provide a consistent environment or 'ecosystem' allowing jobs to be computed on a cloud computing system that has been suitably adapted.

Enablement and Deployment of an Application

According to one embodiment, there is provided a method for enabling an application to run on a cloud computing system, and for deploying such an enabled application to the cloud computing system.

Those skilled in the art will appreciate that normal applications may not readily be able to run on a cloud computing system. Without limiting the scope of the invention, 'enablement' may be understood to mean the steps undertaken to ensure that a particular application can be run on a cloud computing system. Such steps may include modifying the programming of the particular application itself, or programming separate elements so that the application can run without being modified (for example, the splitting algorithm and task processor of the present specification).

Further, and without limiting the scope of the invention, 'deployment' may be understood to mean those steps taken to make the enabled application available to run on the cloud computing system.

An application may be any suitable computer program adapted to perform jobs on a computer. The term 'job' in this context is intended to encompass any specified workload that an application does, and it may be considered to be synonymous with 'work' and other terms used by those in the art. As those skilled in the art will appreciate, the range of available applications is vast from the straightforward through to the complex and specialised. It may be more suitable for applications whose jobs are complex (thus necessitating the extra computing power provided by a cloud computing system). Some possible examples are applications for rendering images, applications for calculating trade pricing information, and applications for analysing bioinformatics data.

A job may be specific to the application. For the purpose of this specification, this will be referred to as a job having a 'job type'. For example, a job type may indicate that a job is a rendering computation associated with a certain rendering application. Two distinct jobs may be considered to have the same job type if they are workloads associated with the same application. For example, a first job may be rendering a sequence of frames for an advertisement and a second job may be rendering a scene for a movie. Both the first job and the second job would have the same 'job type' since they are both associated with the same rendering application.

Jobs may be split into parallelisable tasks. Parallelisation is well-known in computing technology and therefore there is no need to detail it closely here. Ultimately, parallelisation allows a large job to be 'broken down' into smaller tasks that can be computed independently. It is this parallelisation process that lets jobs be divided across multiple central processing units/compute nodes, so the job can be computed more quickly (typically relying on simultaneous processing to achieve processing time gains). Those skilled in the art will appreciate that there are many possible approaches to parallelisation. Parallelisation can be a number of types, from data parallelisation to task parallelisation. For very simple parallel jobs, the process for splitting into parallelised tasks can be straightforward (for example, multi-frame rendering jobs may be split into individual frames or possibly sub-frames, which can each be rendered separately). For more complex jobs, the process for splitting into parallelised tasks relies on complex algorithms, particularly where the resulting tasks are inter-dependent. A job (being a workload for the application) may be considered to be a collection of one or more work items, where each work item is the smallest amount of work the job can be split into. A parallelised task may consist of a single work item or a plurality of work items depending on the optimal load balancing characteristics of the workload.

In some cases it might not be necessary, desirable or possible to split jobs into parallelisable tasks. There are also cases where the parallelisation may be complex or difficult to implement. In such cases a job may be considered to consist of a single task. The task may consist of a single work item or a plurality of work items.

Figure 3:
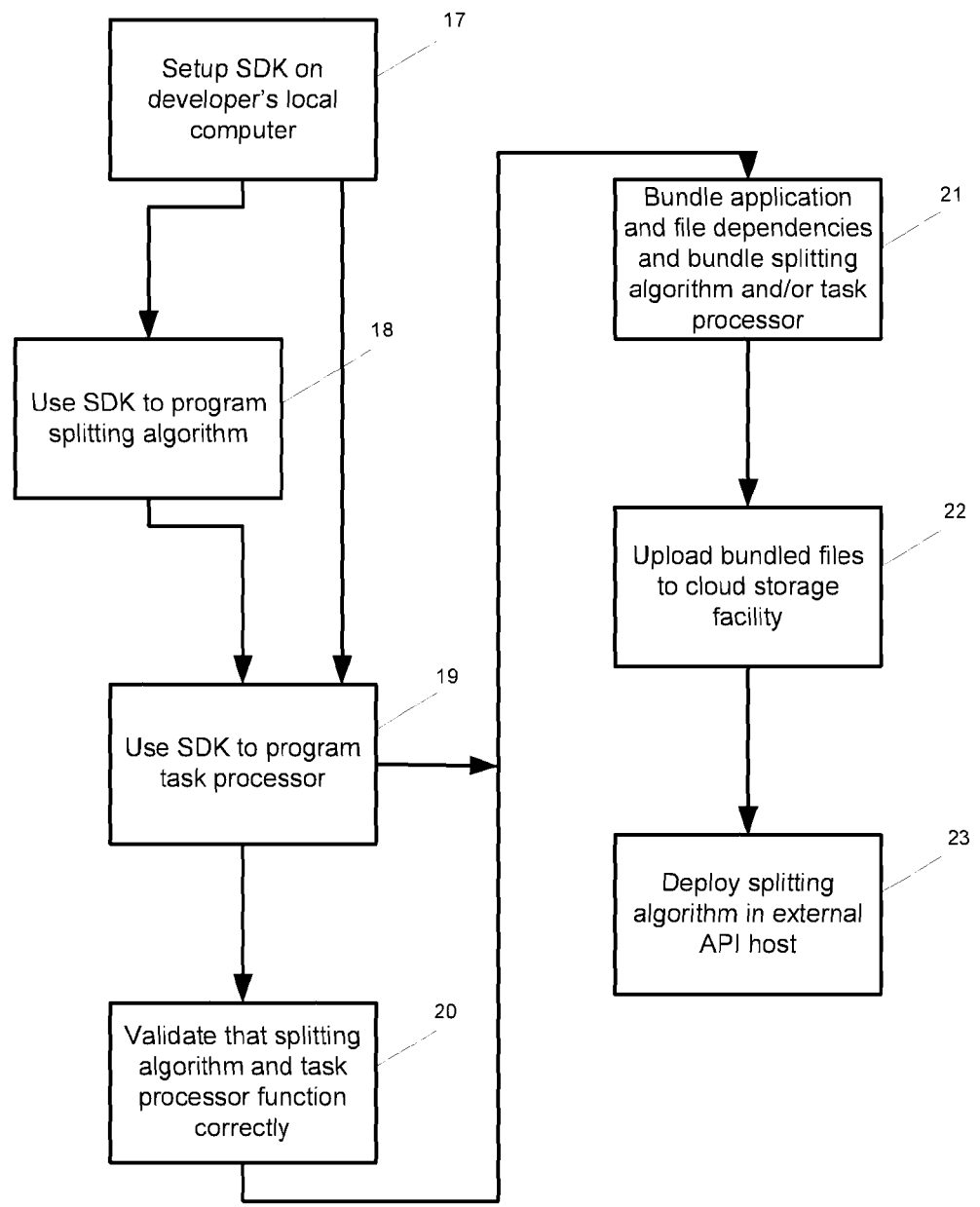
FIG. 3 shows a flow diagram relating to a method for enabling and deploying an application to a cloud computing system.

Referring to FIG. 3, there is shown a flow chart relating to the method for enabling and deploying an application to a cloud computing system.

Typically, enabling an application to run on the cloud computing system will be done by a developer on a developer's local computer. The developer's local computer may be set up 17 with a suitable software development kit (SDK) that is configured to implement the enablement method described in more detail below. Those skilled in the art will appreciate that there are many ways to program and run an SDK. The developer's local computer and SDK thereon may be adapted to connect and communicate with the external API (as described in relation to FIG. 1).

As will be understood from the following, the SDK will be configured so as to 'cooperate' with the external API and middleware layer. As such, it can be ensured that the splitting algorithm and task processor programmed using the SDK (as outlined below) will also work consistently with the external API and middleware layer.

Using the SDK, a developer is provided with an interface that allows the developer to program 18 a splitting algorithm for a specific application. The splitting algorithm will be adapted to split jobs for the application into parallelised tasks. Since parallelisation is dependent on the job type, the splitting algorithm will be specific to the application for which it is created. However, since the underlying code for programming the splitting algorithm is provided as part of the SDK, it can be ensured that the resultant splitting algorithm is in a format that can be 'understood' by the external API host. Upon implementation, the splitting algorithm may be deployed as part of the external API host. The splitting algorithm may be deployed by uploading to the cloud storage facility from where the external API host is able to retrieve it. The splitting algorithm is applied to jobs of the particular job type for which the splitting algorithm was programmed. The splitting algorithm will split the jobs into tasks. As discussed in more detail below, in some embodiments the application on the user's computer may split the jobs into tasks using logic defined within the application itself (rather than being developed as part of the SDK and deployed to the cloud computing system).

As an example of splitting a job, the developer may elect that for a multi-frame animation job associated with a rendering application each task shall be defined as a single frame within that multi-frame animation. The splitting algorithm is then programmed such that for jobs from this rendering application, tasks are created with each task being a unique 'object'. The tasks will have parameters that define the scope of the task, e.g. the frame number. The splitting algorithm may also define other relevant parameters for the task, for example, what texture data files are relevant to the frame.

Once the splitting algorithm has been finalised, the code may be compiled.

As mentioned above, in other possible embodiments rather than deploying a splitting algorithm as part of the external API host, the developer may manage the splitting of a job into tasks within the application itself (on the user's computer). In this embodiment, the application will submit the individual tasks to the external API and no splitting algorithm will be executed on the cloud computing system.

In one possible embodiment, the splitting algorithm may not be deployed as part of the external API host, but may be dealt with by the particular application. In such an embodiment, the user or application may submit a job, including the tasks having already been split from the job, to be computed on the cloud computing system. The developer thus has more freedom in programming the splitting logic as it runs within the application that the developer is most familiar with and can more easily be influenced by other application-specific logic and parameters (and not as part of the external API host). It is also easier for the developer to deploy and make subsequent modifications or updates.

There may even be cases where there is no job splitting required. For example, where the jobs for a particular application will always consist of a single task. In such an embodiment, the developer will simply submit individual tasks to the external API to be computed by the cloud computing system.

Using the SDK, a developer is provided with an interface that allows the developer to program 19 a task processor for a specific application. The task processor provides a means for calling/initiating the enabled application executable (e.g. the rendering executable or the bioinformatics executable), along with, for each task within a job of the job type, the arguments that need to be passed to the enabled application process in order to process the task. Upon implementation, the task processor will be deployed to a compute node. The task processor may be in the form of an application programming interface that interacts between the middleware layer on the compute node and the tasks that are submitted to the compute node. Since the underlying code for programming the task processor is provided as part of the SDK, it can be ensured that the resultant task processor is in a format that can be 'understood' by the middleware layer. In other words, since each compute node has the same middleware layer, the task processor does not need to be specific to any type of compute node and only needs to be programmed to interface with the middleware layer (which is consistent across all the compute nodes in the cloud computing system). The task that has been allocated to a specific compute node is passed to the task processor by the middleware layer. The task processor in turn pulls out the necessary parameters from the task, which can be passed as appropriate arguments (in accordance with the arguments expected by the enabled application executable) to an application executable that is mounted to the compute node or made available on the compute node by some other means.

To simplify the enablement process, the programming of the task processor for a specific application may be facilitated by a "wizard" or setup assistant. The user interface may guide the developer through a set of steps to specify the application executable to be called on each compute node for each task and the arguments that need to be passed to the enabled application process in order to process the task. Those skilled in the art will appreciate how such a wizard may be configured, and the invention is not limited in this respect.

Taking the above example, the developer has already determined that for a multi-frame animation job associated with a rendering application each task shall be defined as a single frame within the multi-frame animation. Therefore the task processor will then be programmed such that for tasks split from jobs from this rendering application, it is able to take the relevant parameters from the task (e.g. the frame number), and establish arguments that can be passed with an instruction to run the rendering application executable and thus process the task.

It is this combination of the splitting algorithm and the task processor that allows an application to be run on a cloud computing system without a developer having to modify the underlying code or logic of the application. In this way, the cloud computing system will be able to compute jobs of the job type associated with the application. Further, since the splitting algorithm and task processor are programmed (via the SDK) to interface with the external API host and the middleware layer, the application is not specific to any particular type of cloud computing system and does not need to undergo further specialisation to run on other cloud computing systems (provided the cloud computing system has been adapted to include the external API host and the middleware layers).

Having programmed the splitting algorithm and the task processor, the developer may optionally validate 20 that the splitting algorithm and the task processor will function correctly before deploying them to the cloud computing system. The cloud computing system may be emulated on the developer's local computer. The validator and emulator may be provided as part of the SDK. The emulator may simulate the external API host and the middleware layer running on the cloud computing system. The emulator will run the splitting algorithm as deployed in the simulated external API host. The emulator will then apply the task processor for each of the tasks that are produced by the splitting algorithm. The validator and emulator may be adapted to detect errors and warnings, and report these suitably to the developer so that they can be remedied.

The next step is to upload the application and file dependencies, splitting algorithm and task processor to the cloud computing storage facility. The enabled application executable and any dependencies may be bundled 21 into a suitable file format, for example, a virtual hard disk (VHD) file. Those skilled in the art will appreciate that any suitable file format, with or without compression, may be used. For some applications that are bulky, the developer may bundle only the relevant parts of the application, for example, removing graphical user interface aspects of an application (which would be irrelevant to the computation being performed on the compute nodes in the cloud computing system). Similarly, the splitting algorithm and task processor may be bundled 21 into a suitable file format, for example a ZIP file. Again, those skilled in the art will appreciate that any suitable file format, with or without compression, may be used.

The bundled files are then uploaded 22 from the developer's local computer to the cloud computing system. The bundled files may be uploaded 22 to the cloud storage facility via the external API or directly using the cloud storage facility's inherent APIs.

In one embodiment, the splitting algorithm may be deployed 23 directly into the external API host. As will be described in more detail below, the splitting algorithm detects the submission of a job (of the job type for which the splitting algorithm has been adapted) to the external API. The task processor resides on the cloud storage facility until the compute nodes are provisioned.

The application has now been enabled to run on the cloud computing system and deployed to the cloud computing system. Because of the way in which the task processor and splitting algorithm are programmed (via the SDK) to interface with the external API host and the middleware layer, the application (once it has been enabled) can quickly be deployed to any existing cloud computing system (provided the cloud computing system includes the external API host and the middleware layer). In particular, the enablement and deployment process is identical regardless of the underlying cloud platform (IaaS/PaaS) of the cloud computing system. In other words, the SDK, external API host and middleware layers cooperate together to establish an 'ecosystem', which allows applications to be enabled easily to run on the cloud computing system and deployed to the cloud computing system. Other benefits of this method of enablement and deployment are best demonstrated by looking at the computing of a job for the application on the cloud computing system.

Runtime Job Execution

Figure 4:
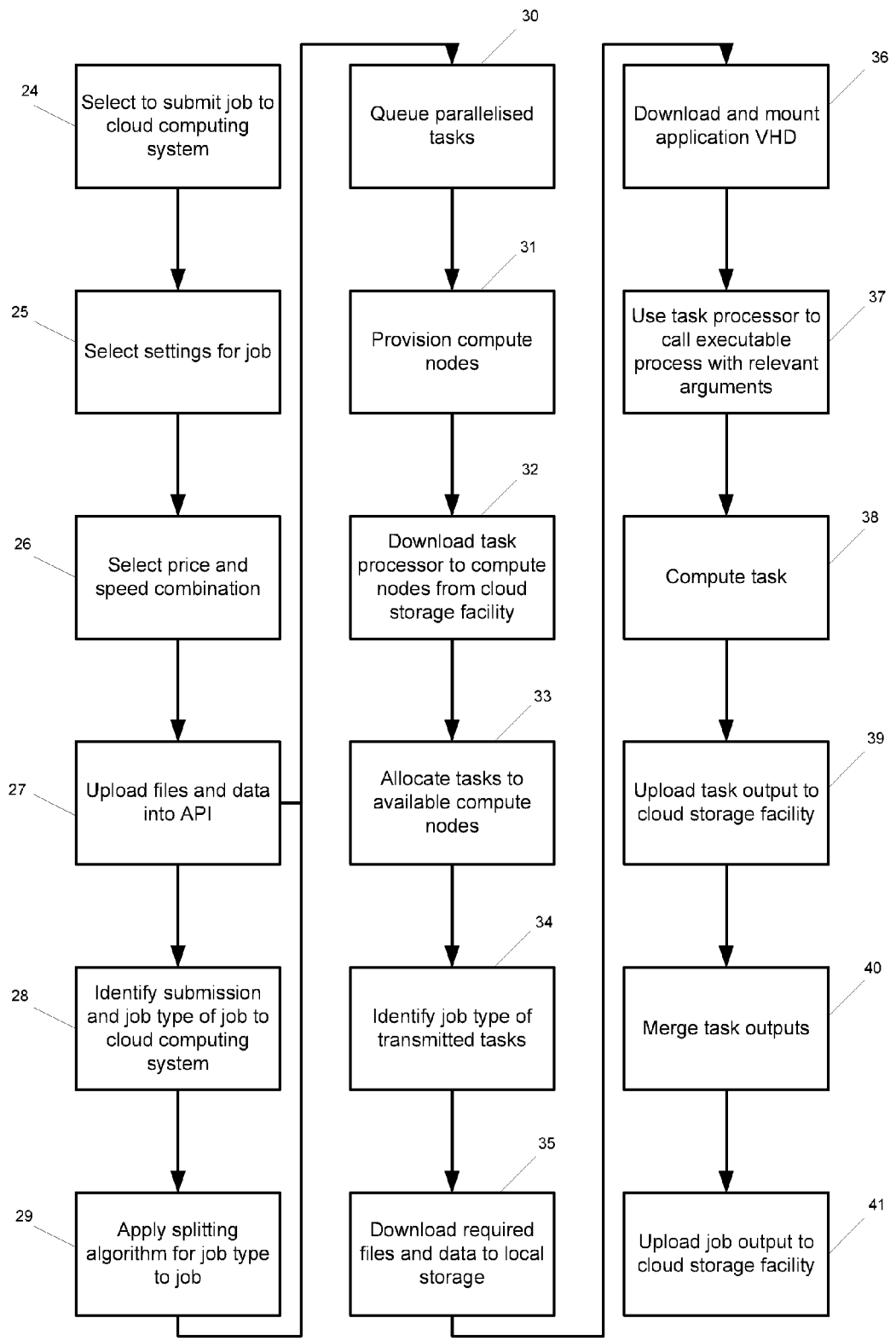
FIG. 4 shows a flow diagram relating to a method for computing a job on a cloud computing system.
Figure 5:
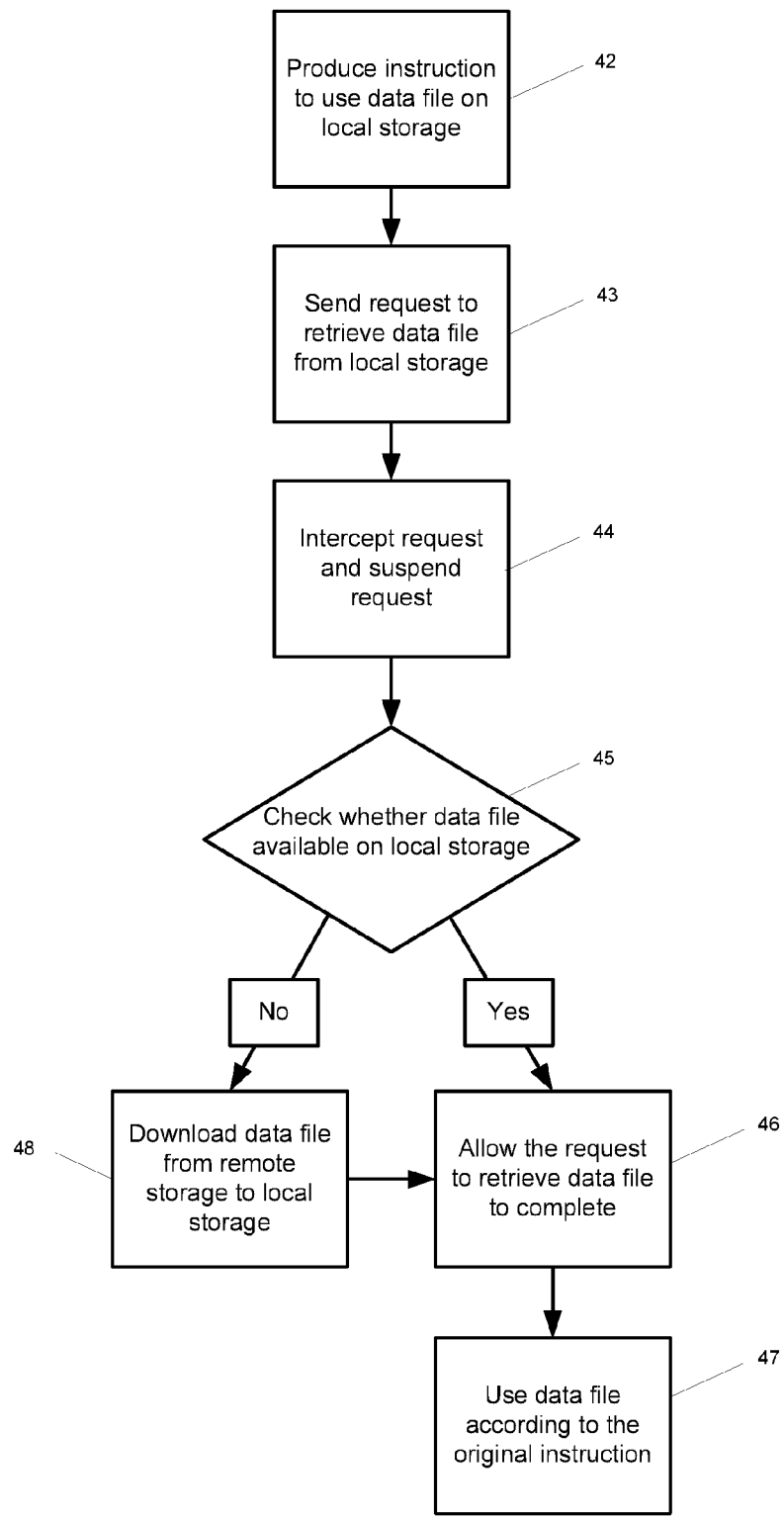
FIG. 5 shows a flow diagram relating to a method for executing an application using a file system interception layer.

Referring to FIG. 4, there is shown a flow chart relating to the method for computing a job on a cloud computing system, which has been adapted to run applications according to the enablement and deployment method described in the preceding section.

It is possible that the cloud computing system may have multiple applications enabled to run on the cloud computing system. In this way, the cloud computing system may be able to compute jobs of a number of job types (wherein each job type corresponds to the applications enabled to run on the cloud computing system)—that is to say, they are 'supported' job types. For each supported job type, there may be an associated splitting algorithm and an associated task processor. For certain job types (in particular jobs that cannot be split into parallelisable tasks) there may not be an associated splitting algorithm. In accordance with the above deployment process, the splitting algorithms may be deployed as part of the external API host or they may be stored on the cloud storage facility. Similarly, the task processors may be stored on the cloud storage facility.

In another possible embodiment the splitting logic is contained with the particular application running on the user's computer. Those skilled in the art will appreciate there are many ways in which the splitting algorithm can run on the user's computer. For example the splitting algorithm may be part of a plug-in on the application, a stand-alone utility or on a purpose built platform.

As discussed above, some jobs will not require any splitting. In those cases the job comprises a single task.

A user, using an application on a user local computer, has a job in that application that needs to be computed. Interfacing with the external API, the user selects 24 to have the job computed on the cloud computing system. This may be through a plug-in provided in the application running on the user local computer. The plug-in may allow the user to select cloud processing for a job within the application. The plug-in (or other suitable programming interface) may have been developed for the application using the SDK referred to in the previous section.

Upon selecting to submit the job to the cloud computing system, the user may be presented 25 with a number of optional settings for the operating characteristics for computing the job, which can include, but is not limited to, options to:
  Select a speed for computing the job;
  Select a security level for computing the job;
  Select a geographic restriction for computing the job; and
  Be provided with an initial estimate of the time for job completion or the price for job completion.

Those skilled in the art will appreciate that pricing the computation of a job on a cloud computing system is difficult since it can be difficult to accurately determine how the job will progress. The cloud computing system may include a commercial engine that is adapted to provide costs for computing jobs. Such a commercial engine may be adapted to consider:
  A prediction of the job execution time, which may have previously been estimated;
  Job requirements (such as geography, core type and security requirements);
  User requirements (such as CPU type, virtual machine size, public vs private, geography and security requirements);
  Availability of compute capacity;
  Whether compute nodes are already provisioned;
  Time taken to provision compute nodes;
  Charging policy of the cloud computing service provider (for example, some providers charge by the 'wall clock', charging for a full hour of usage, even if a compute node is in actual use for less than an hour); or
  Number of parallelisable tasks.

In one embodiment, the user may be presented 26 with an offer to compute the job on the cloud computing system for a range of different price and speed combination options, with the user able to select a preferred option. This may be a discrete range or a continuous range. Each combination of price and speed may correspond to a particular configuration of compute cores that are ultimately provisioned to compute the job on the cloud computing system. The price may be a fixed cost (i.e. a price cap) or may be an estimate.

The external API host may determine a number of possible configurations (for example the type of cores and/or the number of cores used for the job). For example, the rendering of a 100-frame video may be rendered using 10 cores, 50 cores or 100 cores. For each configuration, costs and timeframes for computing the job may be determined. This may include considering any of: pricing for use of resources in the cloud computing system, geography of resources in the cloud computing system, availability of resources in the cloud computing system, security requirements for the job, and number of parallelisable tasks.

In one embodiment the configurations that are costed and timeframed may include the least expensive (and most likely slowest) and fastest (and most likely most expensive) configurations. In addition, any configuration that lies between these extremes may be considered. The cheapest configuration may be where just a single core or compute node is provisioned (which would thus not realise the benefits of parallelisation). The fastest configuration may be limited by the maximum number of parallelisable tasks (for example, 100 cores as per the above rendering of a 100-frame video). This may require estimating the number of parallelisable tasks or first splitting the job according to the splitting algorithm (as described below).

Upon selecting 25, 26 the operating characteristics for computing the job, the job is submitted 27 to the cloud computing system via the external API. The job will be submitted 28 as an 'entity' that is specific to the application with the job type specified. The job 'entity' may include other variables (for example, those related to the operating characteristics) which are used by the external API host to determine how the job will be run. Data may be synced between the user local computer and the cloud storage facility via the external API. This can include data that is related to the application or the specific job.

In cases where the splitting algorithm has been deployed to the external API host, once submitted 28 to the cloud computing system, the external API host automatically identifies the job type of the submitted job, and starts 29 the splitting algorithm that was programmed for that job type. The job is then split into a plurality of parallelisable tasks according to the splitting algorithm.

In cases where splitting occurs within the application on the user's computer, both the job and the collection of tasks that comprise the job are submitted to the cloud computing system via the external API. If the job was such that splitting was unnecessary or undesirable, the job and the single task it comprises is submitted to the cloud computing system.

The tasks resulting from the user's computer or the splitting algorithm are then queued 30 to be processed by the compute nodes. This may include loading the tasks in the temporary storage in a message queue. The tasks reside in the temporary storage until they are allocated to a compute node.

The next step is to provision 31 compute nodes, which is done by the cloud resource controller. To determine which compute nodes should be provisioned, the cloud resource controller may be adapted with a suitable provisioning engine. The engine may consider any of the following inputs:
  Availability of compute nodes/processing cores;
  Number of tasks;
  Speed of processing cores;
  Costs of compute nodes/processing cores;
  Priority of job;
  Cost requirements of job;
  Security requirements of job;

Time taken to provision compute nodes;

Charging policy of the cloud computing service provider; (for example, it may be cost ineffective to provision 1000 compute nodes, which will only be in use for five minutes, but still charged for an entire hour); or Whether certain compute nodes/processing cores have already been provisioned.

Where the cloud resource controller is adapted to interface with a plurality of different cloud computing systems (either directly or via the routing mechanism), the cloud resource controller may receive inputs from a plurality of different cloud computing systems, and may be able to provision compute nodes within a single cloud computing system, or compute nodes across a plurality of cloud computing systems.

The cloud resource controller will then provision 31 the compute nodes using the appropriate mechanism provided by the cloud computing service provider. Typically this is done through the cloud computing service provider's cloud management API. Provisioning a compute node includes starting up the compute node (which includes the platform layer and middleware layer). Those skilled in the art will appreciate that this process will be dependent upon the particular configuration and type of compute nodes in the cloud computing system. Provisioning also includes downloading 32 the task processor for the particular job type from the cloud storage facility to the provisioned compute node. Since a single task processor may not be a very large file, provisioning a compute node may include loading all the associated task processors for the supported job types. According to one embodiment, the bundled application files for the job type may also be downloaded to the compute nodes but typically this will be performed when a task for a particular job type is first allocated to an individual compute node. Where the application files are in a VHD file or similar, they may be mounted as a disk on the compute node.

The cloud resource controller may include job prioritization logic, which determines in what order jobs are allocated 33 to available provisioned compute nodes. Where there are a plurality of different cloud computing systems (for example two distinct cloud computing systems provided by two different cloud computing service providers), the tasks may be allocated 33 to compute nodes within one cloud computing system, or to compute nodes spread across the plurality of cloud computing systems. An available provisioned compute node may indicate to the cloud resource controller that they are available to process a task. The cloud resource controller, based on the prioritization, will then let the compute node know which job it should process. The compute node will then access the first task in the message queue (on the temporary storage) for that job and the task will be transmitted to the compute node.

The task processor on the provisioned compute node identifies 34 the job type of a task transmitted to the compute node. If the bundled application files (the enabled application executable and dependencies) for the job type have not already been downloaded to the compute node, they are downloaded 35 to the compute node (and mounted 35 if required). The required data files (as indicated by the task) may also be downloaded 35 to local storage on the compute node. The task processor then pulls out the necessary parameters from the task. The task processor initiates 37 the appropriate executable (within the downloaded enabled application) in accordance with the parameters of the task. The instructions may be passed to the application executable in the form of a command-line request with the necessary arguments. The compute node then processes 38 the task.

Once the task is processed, the task output(s) is uploaded 39 to the cloud storage facility. From here, they can be accessed by the end user through the external API. The external API may be adapted to notify the user that a task has completed. The compute node then lets the cloud resource controller know that it is available so that another task (for either the same or a different job) is allocated to the compute node. In the event that the compute node is allocated a task of a job type that the compute node has already computed, the compute node will not unmount and delete the application files until the compute node is shut down by the cloud resource controller.

Once all of the tasks for the job have been processed, the user may be notified so that they can access the task outputs from the cloud storage facility via the external API. In one embodiment, the splitting algorithm may include code that produces a task that is dedicated to the process of merging 40 the completed task outputs to produce a suitable job output or performing some other post-processing logic. For example, in an animation job, the 'merge task' may merge all the rendered frames (i.e. each task output) to produce a movie file in a suitable format. The merge task will be the last task in the queue. Depending on the required job output, the task processor will download all of the preceding task outputs (that have previously been uploaded 39 to the temporary storage or the cloud storage facility) so that the merge task can be completed. Once the merge task is completed, the job output is uploaded 41 to the cloud storage facility or the temporary storage. From here, the job output can be accessed by the end user through the external API. The external API may be adapted to notify the user that the computing of a job has completed.

The above description demonstrates some of the benefits of the method of enabling an application to run on the cloud computing system. Jobs can be computed quickly on the cloud computing system that supports the job type. Due to the task processor, the compute nodes can be provisioned quickly, and do not need a complex and time-consuming series of steps to be able to configure and process the task. The description also demonstrates how the SDK, external API host and middleware layers cooperate together to form an 'ecosystem', which allows a job to be split and computed across multiple compute nodes and platforms efficiently.

File System Interception Layer

A problem with the above method is that the application's file dependencies or the job's file dependencies may be large and take a long time to download to each compute node (either when the compute node is provisioned or when a task is transmitted to the compute node). Such a download time can consequently cause the time and cost for the job to be computed to balloon unnecessarily—particularly when repeated across each provisioned compute node. Therefore, provisioning the compute node may include setting up a file system interception layer that removes the requirement to download all of the file dependencies to each compute node. Additionally, it may be difficult or even impossible to identify required data inputs/files prior to the execution of a particular process. The file system interception layer allows for dependent files to be downloaded 'on-demand' i.e. as they are actually required by an executing process.

According to one embodiment, the file system interception layer is adapted for the following method of executing an application as shown in the flow chart of FIG. 4. Executing an application can include executing an executable process that is called by a task processor when processing a task according to the previously described methods of computing a job on a cloud computing system. The task may require accessing a data file that is stored on local storage. That is to say, the application executable may refer to and require a data file that is at a specified path or file location on the local storage of the compute node.

Normally, when an instruction is produced 42 by the running application executable to use a data file on the local storage, a request will be sent 43 to the file system to retrieve the required data file from the specified path. Such a request will be produced according to the particular file system architecture of the compute node operating system.

In terms of abstraction levels, the file system interception layer may be considered to be at the same level as the platform. The file system interception layer detects that there has been a request to retrieve a data file from the specified path on the local storage of the compute node and intercepts the request 44. The file system interception layer temporarily suspends 44 the request from completing.

The file system interception layer then checks 45 to determine whether the required data file is actually available on the local storage at the specified path.

If the required data file is available on the local storage, then the file system interception layer allows 46 the request to complete 47 as it would normally. The data file is retrieved and is used by the application executable as though the file system interception layer didn't exist. In this way, the interception of the file request is transparent to the compute node.

If the required data file is not available on the local storage, then the file system interception layer downloads 46 the required data file from a remote storage facility (e.g. storage separate from compute node). The remote storage may be the cloud storage facility described earlier in relation the cloud computing system. The data files may be stored on the remote storage facility with the same file hierarchy as they would be if they were stored on the local storage. If they are stored with the same hierarchy, the file system interception layer can easily locate the data file on the remote storage based on the path specified in the retrieval request. The required data file is downloaded 48 to the specified path on the local storage. Once downloaded, the file system interception layer allows the request to complete 47. The data file is retrieved and is used by the application executable according to the original instructions in the task. In this way, the interception of the file request is transparent to the compute node.

Thus it is not necessary to download the application's file dependencies or the job's file dependencies to the compute node before commencing a job. The file system interception layer will automatically download any missing data files to the local storage as and when they are needed. Since the file system interception layer is fully transparent to the application/processor, there is no need to adjust the code of the application or the task.

It is noted that whilst the file system interception layer has been described in the context of the compute nodes of the cloud computing system, it may be applied to any number of situations where an application is processed on a processor and it would be suitable to not have to download all of the file dependencies related to the application.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

What is claimed is:

1. A computer-implemented method performed by one or more processors when running executable code, the computer-implemented method comprising:
    assigning a plurality of compute nodes of a distributed computing system to execute one or more tasks corresponding to a job assigned to the plurality of compute nodes;
    provisioning each compute node with a middleware layer that permits each compute node to interface with a given task processor regardless of the compute node's underlying configuration, and the middleware layer comprising a file system interception layer;
    wherein the file system interception layer automatically downloads any missing data files to local storage of the compute node as and when any missing data files are needed to process task dependent files so that the automatic download does not download file dependencies that are not required in order to process the one or more tasks assigned to a compute node, and wherein automatically downloading any missing data files at the file system interception layer comprises:
        detecting a request to retrieve a data file from a specified path on local storage of the compute node;
        temporarily suspending the request from completion;
        checking to determine whether the requested data file is available on the compute node's local storage; and
        if the requested data file is available, allowing the request to proceed to completion; and if the requested data file is not available, downloading the requested data file from remote storage of the distributed computing system to the specified path on the local storage of the compute node, and wherein the requested data file is stored on the remote storage with a file hierarchy that is the same hierarchy as would be used if the requested data file were stored on the computer node's local storage.

2. The computer-implemented method as claimed in claim 1, wherein the remote storage is maintained within a cloud computing system.

3. The computer-implemented method as claimed in claim 1, wherein each compute node includes a platform and the file system interception layer is at the same abstraction level as the platform.

4. The computer-implemented method as claimed in claim 1, wherein a management API of the distributed computing system controls general aspects of running the compute nodes including allocation of resources, back up procedures, and network management.

5. The computer-implemented method as claimed in claim 4, wherein an external host of the distributed computing system manages deployment of applications to the distributed computing system.

6. The computer-implemented method as claimed in claim 5, wherein the external host incudes an external API that interfaces to one or more local user computing systems.

7. The computer-implemented method as claimed in claim 6, wherein a resource controller of the distributed computing system is connected to the external host and to a management API of the distributed computing system, and wherein assigning the plurality of compute nodes to execute a task is performed by instructions provided by the external host to the resource controller to assign a required number of compute nodes via the management API.

8. A distributed computing system comprising:
a plurality of compute nodes assigned to execute one or more tasks corresponding to a job assigned to the plurality of compute nodes, each compute node comprising local storage;
remote storage accessible by each compute node;
each compute node comprising a middleware layer that permits each compute node to interface with a given task processor regardless of the compute node's underlying configuration, and the middleware layer comprising a file system interception layer that does not require downloading all file dependencies otherwise required for processing the one or more tasks assigned to a compute node by automatically downloading any missing data files to local storage of a compute node processing a task as and when such missing data files are needed to process task dependent files, wherein downloading any missing data files at the file system interception layer comprises:
detecting a request to retrieve a data file from a specified path on local storage of the compute node;
temporarily suspending the request from completion;
checking to determine whether the requested data file is available on the compute node's local storage; and
if the requested data file is available, allowing the request to proceed to completion; and
if the requested data file is not available, downloading the requested data file from remote storage of the distributed computing system to the specified path on the local storage of the compute node, and wherein the requested data file is stored on the remote storage with a file hierarchy that is the same hierarchy as would be used if the requested data file were stored on the compute node's local storage.

9. The distributed computing system as claimed in claim 8, wherein the remote storage is maintained within a cloud computing system.

10. The distributed computing system as claimed in claim 8, wherein each compute node includes a platform and the file system interception layer is at the same abstraction level as the platform.

11. The distributed computing system as claimed in claim 8, wherein a management API of the distributed computing system controls general aspects of running the compute nodes including allocation of resources, back up procedures, and network management.

12. The distributed computing system as claimed in claim 11, wherein an external host of the distributed computing system manages deployment of applications to the distributed computing system.

13. The distributed computing system as claimed in claim 12, wherein the external host incudes an external API that interfaces to one or more local user computing systems.

14. The distributed computing system as claimed in claim 13, wherein at least one local user computing system comprises a software development kit (SDK) adapted to program a splitting algorithm that splits jobs for each application into parallelized tasks.

15. The distributed computing system as claimed in claim 14, wherein the SDK is further adapted to program a task processor for each application and wherein each task processor initiates an application executable along with required arguments required to process a given task of the application.

16. The distributed computing system as claimed in claim 15, wherein each application is bundled with file dependencies and wherein each splitting algorithm and each task processor are bundled for a give application and uploaded to the remote storage of the distributed computing system.

17. The distributed computing system as claimed in claim 16, wherein the external host enables the distributed computing system to run any given splitting algorithm when managing computing jobs and tasks of an application.

18. The distributed computing system as claimed in claim 13, wherein a resource controller of the distributed computing system is connected to the external host and to a management API of the distributed computing system, and wherein assigning the plurality of compute nodes to execute a task is performed by instructions provided by the external host to the resource controller to assign a required number of compute nodes via the management API.

19. The distributed computing system as claimed in claim 18, wherein the distributing computing system comprises temporary storage used to store tasks before they are accessed by compute nodes.

20. A computer program product comprising a hardware storage device containing computer-executable instructions which, when executed by one or more processors, causes execution of a computer-implemented method comprising:
assigning a plurality of compute nodes of a distributed computing system to execute one or more tasks corresponding to a job assigned to the plurality of compute nodes;
provisioning each compute node with a middleware layer that permits each compute node to interface with a given task processor regardless of the compute node's underlying configuration, and the middleware layer comprising a file system interception layer;
wherein the file system interception layer automatically downloads any missing data files to local storage of the compute node as and when any missing data files are needed to process task dependent files so that the automatic download does not download file dependencies that are not required in order to process the one or more tasks assigned to a compute node, and wherein automatically downloading any missing data files at the file system interception layer comprises:
detecting a request to retrieve a data file from a specified path on local storage of the compute node;
temporarily suspending the request from completion;
checking to determine whether the requested data file is available on the compute node's local storage; and
if the requested data file is available, allowing the request to proceed to completion; and
if the requested data file is not available, downloading the requested data file from remote storage of the distributed computing system to the specified path on the local storage of the compute node, and wherein the requested data file is stored on the remote storage with a file hierarchy that is the same hierarchy as would be used if the requested data file were stored on the computer node's local storage.

21. The computer program product as claimed in claim 20, wherein the remote storage is maintained within a cloud computing system.

22. The computer program product as claimed in claim 21, wherein each compute node includes a platform and the file system interception layer is at the same abstraction level as the platform.

23. The computer program product as claimed in claim 21, wherein a management API of the distributed computing system controls general aspects of running the compute nodes including allocation of resources, back up procedures, and network management.

24. The computer program product as claimed in claim 23, wherein an external host of the distributed computing system manages deployment of applications to the distributed computing system.

25. The computer program product as claimed in claim 24, wherein the external host incudes an external API that interfaces to one or more local user computing systems.

26. The computer program product as claimed in claim 25, wherein a resource controller of the distributed computing system is connected to the external host and to a management API of the distributed computing system, and wherein assigning the plurality of compute nodes to execute a task is performed by instructions provided by the external host to the resource controller to assign a required number of computer nodes via the management API.

* * * * *